United States Patent [19]

Schad et al.

[11] Patent Number: 4,981,638
[45] Date of Patent: Jan. 1, 1991

[54] METHOD AND APPARATUS FOR CLAMPING AN INJECTION UNIT TO A MOLDING MACHINE

[75] Inventors: Robert D. Schad, Toronto; Paul P. Brown, Orangeville, both of Canada

[73] Assignee: Husky Injection Molding Systems Ltd., Ontario, Canada

[21] Appl. No.: 294,308

[22] Filed: Jan. 6, 1989

Related U.S. Application Data

[63] Continuation-in-part of Ser. No. 150,157, Jan. 29, 1988, Pat. No. 4,867,938.

[51] Int. Cl.⁵ .............................................. B29C 45/12
[52] U.S. Cl. ............................ 264/297.2; 264/328.11; 264/328.13; 425/557; 425/572; 425/574; 425/588
[58] Field of Search ............. 264/328.11, 297.2, 328.1, 264/328.8, 328.13; 425/542, 557, 562, 567, 572, 574, 581, 588

[56] References Cited

U.S. PATENT DOCUMENTS

| | | | |
|---|---|---|---|
| 3,761,214 | 9/1973 | Hehl | 425/192 |
| 4,342,717 | 8/1982 | Gardner | 425/555 |
| 4,400,341 | 8/1983 | Sorensen | 264/328.8 |
| 4,752,207 | 6/1988 | Kaaden | |
| 4,793,796 | 12/1988 | Kaaden | 425/588 |

FOREIGN PATENT DOCUMENTS

| | | | |
|---|---|---|---|
| 2243823 | 3/1973 | Fed. Rep. of Germany | 425/567 |
| 58-166030 | 10/1983 | Japan | 425/572 |
| 61-193817 | 8/1986 | Japan | 425/572 |
| 625461 | 9/1981 | Switzerland | |

OTHER PUBLICATIONS

Stubbe-Twin-Station Injection-Moulding Machines, four pages (Labelled A, B, C, and D), published Oct. 1986.
Stork L-Type Injection Moulding Machine, two pages (Labelled A and B), published on or about 1985.

Primary Examiner—Jill L. Heitbrink
Attorney, Agent, or Firm—Bachman & LaPointe

[57] ABSTRACT

An injection molding machine including an injection unit and a central movable platen supporting exterior manifold sections communicating with mold halves. The mold halves are clamped along a first axis and the injection unit is clamped to the platen along a second axis generally perpendicular to the first axis.

13 Claims, 3 Drawing Sheets

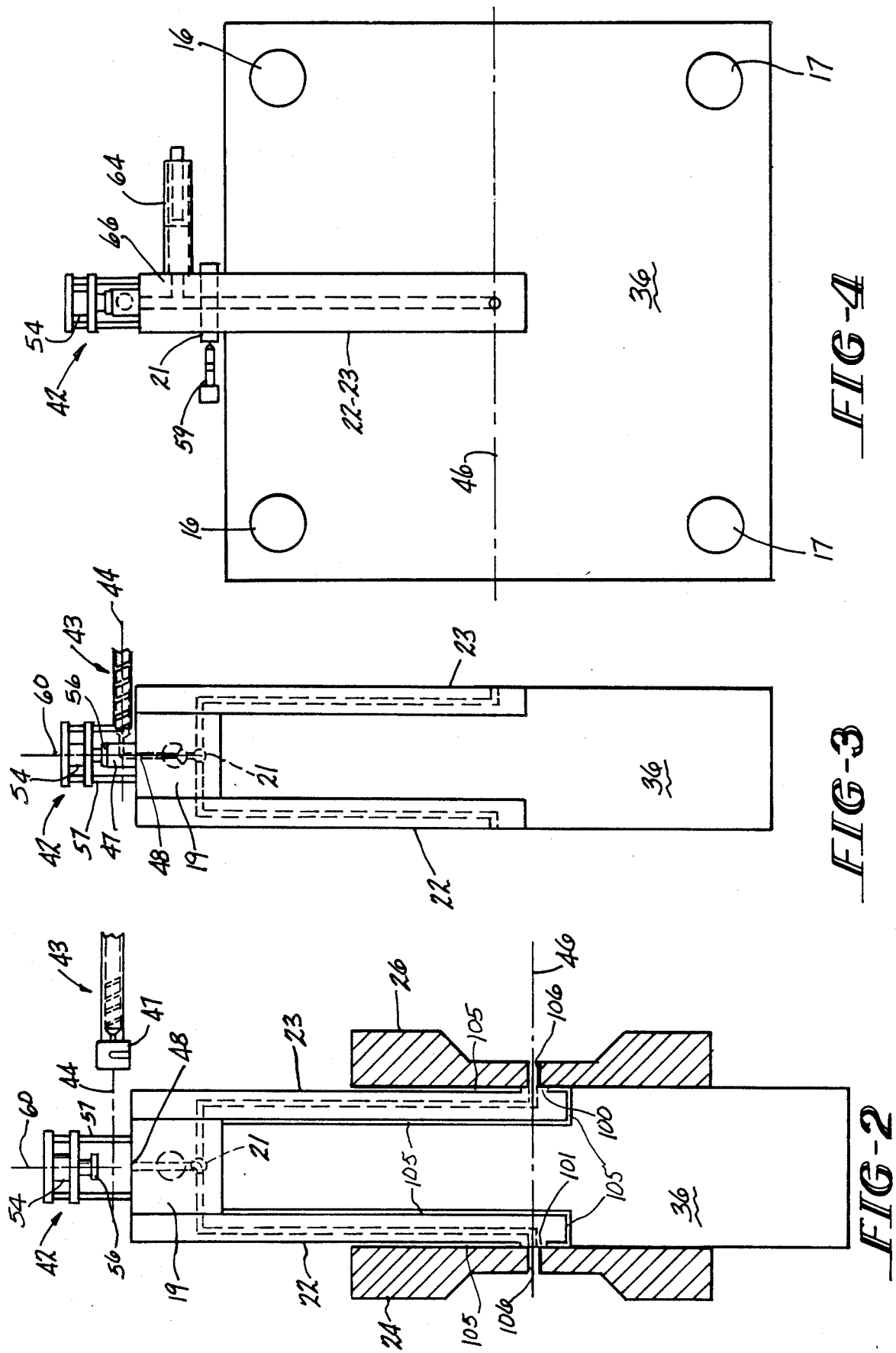

METHOD AND APPARATUS FOR CLAMPING AN INJECTION UNIT TO A MOLDING MACHINE

CROSS-REFERENCE TO RELATED APPLICATION

This application is a continuation-in-part of application Ser. No. 150,157, filed Jan. 29, 1988, by Schad et al., entitled Sequential Injection Molding Process, now U.S. Pat. No. 4,867,938, issued Sept. 19, 1989.

BACKGROUND OF THE INVENTION

The present invention relates to injection molding machines and relates, in particular, to such machines having the capability of operating a plurality of molds arranged in series.

The prior art shows injection molding machines having this capability. For example, U.S. Pat. No. 3,707,342, issued to A. Lohman on Dec. 26, 1972 shows two molds spaced apart in tandem with a dual nozzle injection unit positioned therebetween to fill the two molds alternately. No provision is made for separate means to stuff the molds.

An additional prior art patent pertinent to the present invention is U.S. Pat. No. 3,898,030, issued Aug. 5, 1975 to T. G. Bishop, entitled Injection-Mold Clamping Unit Having Alternately Ejecting Die Assemblies.

In this disclosure, latches 80A and 80B are used to couple separable mold halves 56A and 58A whereby single clamping and ejection units are used for both molds.

A further prior art patent is U.S. Pat. No. Re 28,721 reissued to J. J. Farrell on Feb. 24, 1976, entitled Time Saver plastic Draw-Back Valve Assembly. This patent discloses a primary reciprocating-screw injection unit 12 and an auxiliary injection piston 50 with a valve 52 for diverting molten plastic flow from the primary unit to the secondary unit thereby isolating the primary unit and permitting the secondary unit to "stuff" mold 32.

In addition, the prior art shows stack and sandwich mold arrangements wherein the mold cavity plates are disposed back to back separated by an integral hot runner. Stack or sandwich mold arrangements are well known in the art: however, their drawbacks include a less than optimum operating cycle and lack of versatility in components. Moreover, there is a disadvantage in combining a hot runner with mold elements as a single piece part. Such an arrangement necessitates replacement of a complete multiple element mold and hot runner as a unit when one wishes to change molds. Whereas when the mold elements are separable from the hot runner system, it is merely necessary to remove mold elements while the hot runner remains a machine fixture.

U.S. Pat. No. 4,539,171 to Sorensen is also of interest In the '171 patent, thermoplastic material is transferred from an injection unit to a sandwich mold by means of a so-called snorkel 30 and a cooperating nozzle 16. The snorkel and nozzle make a connection to provide a conduit for thermoplastic material. The snorkel and nozzle move relative to another along a common axis which is parallel to and spaced from central axis 13 along which clamping platens 10 and 11 reciprocate.

Additional publications of interest are U.S. Pat. No. 4,752,207, issued June 21, 1988 to Kaaden including a related brochure entitled "STUBBE—Twin-Station Injection-Moulding Machines" and a brochure by Stork Plastics Machinery entitled "Stork L-Type Injection Moulding Machine".

The '207 Patent and related Stubbe brochure (published October 1986) show a goose neck connection between a plastic injection unit and a distributor carried by a movable platen.

The Stork brochure (published on or about 1985) shows an injection unit disposed perpendicular to the mold clamp unit axis.

SUMMARY OF THE INVENTION

In contrast to the above prior art disclosures, the present invention relates to an injection molding machine having a plurality of molding stations with a plurality of machine accessories arranged in various combinations developing a sequence of operations calculated to reduce molding cycle time per part particularly when molding large parts such as large containers or auto body parts.

It is a primary feature Of the present invention to provide an injection molding machine which enables the mold assemblies to be operable independently of each other and to be readily separable from the machine.

A further feature of the invention is the provision of structure for transferring molding compound from an injection unit to a manifold distributor block along a path which is perpendicular to the clamping axis or the longitudinal machine axis.

A still further feature of the invention is the provision of seal means for sealing the injection unit nozzle to the distributor block orifice along an axis which is perpendicular to the clamping axis.

A further feature of the invention is the provision of a check valve in the distributor block to prevent leakage of resin when the injection unit nozzle is not in sealing contact with the distributor block orifice.

A further feature of the invention is the provision of a central movable platen with individual manifolds on opposite sides of the platen operable to feed moldable resin to mold halves carried by the central platen under the control of valve means positioned upstream of said central platen.

A further feature of the invention is the provision of valve means in the manifold distributor block operable to place the injection unit and/or a packing unit in communication with the individual manifolds, selectively.

A further feature of the invention is the provision of power means for effecting and maintaining the seal between the manifold distributor block and said injection unit.

A further feature of the invention is the provision of a plurality of mold stations arranged in series and separated by a discrete, central, movable machine platen.

An injection molding machine having a series of cooperating mold halves embracing certain features of the present invention may comprise a central movable platen means supported by tie rods, said platen means being movable to and fro along the tie rods, as mold halves are opened and closed, along a path defining the longitudinal machine axis, a movable injection unit including a nozzle for supplying moldable material to the machine, a hot runner system operable to connect with said injection unit nozzle, power means associated with said machine for clamping the nozzle to the hot runner system along an axis which is generally perpendicular to said machine axis, said hot runner system including a manifold distributor means communicating with a manifold means where the manifold means is supported by and disposed on the exterior of said central platen means.

A method embracing certain other principles of the invention and practiced by the operation of the apparatus invention may comprise the steps of providing an injection molding machine including an inlet orifice and a longitudinal mold clamping axis, providing an injection unit including a nozzle fOr supplying moldable material to the injection machine via said inlet orifice, moving the injection unit along an axis generally parallel to the machine axis to a position in which the nozzle communicates with said inlet orifice and thereafter clamping the nozzle to the molding machine orifice by compressing the nozzle against the orifice along an axis which is generally perpendicular to the machine axis.

Other features and advantages of the present invention will become more apparent from an examination of the succeeding specification when read in conjunction with the appended drawings; in which:

BRIEF DESCRIPTION OF THE DRAWINGS

FIG. 2 is a plan view of a portion of FIG. 1, enlarged, showing the hot runner system, the injection unit (extruder), the injection unit nozzle clamp means and mold halves;

FIG. 3 is a view similar to FIG. 2 showing the injection unit in position to supply moldable material to the hot runner system with the injection unit nozzle clamped to the hot runner system;

FIG. 4 is an elevational view of the right side of FIG. 3 showing the valve means for switching molding material to manifold sections, the nozzle clamping means and a packing cylinder or stuffer; and, FIG. 5 is a sectional view, enlarged, as viewed in the plane of the line 5—5 of FIG. 2 and in the direction of the arrows, showing the seal between the nozzle and the manifold distributor block and showing the valve means.

DETAILED DESCRIPTION

Figure 1:
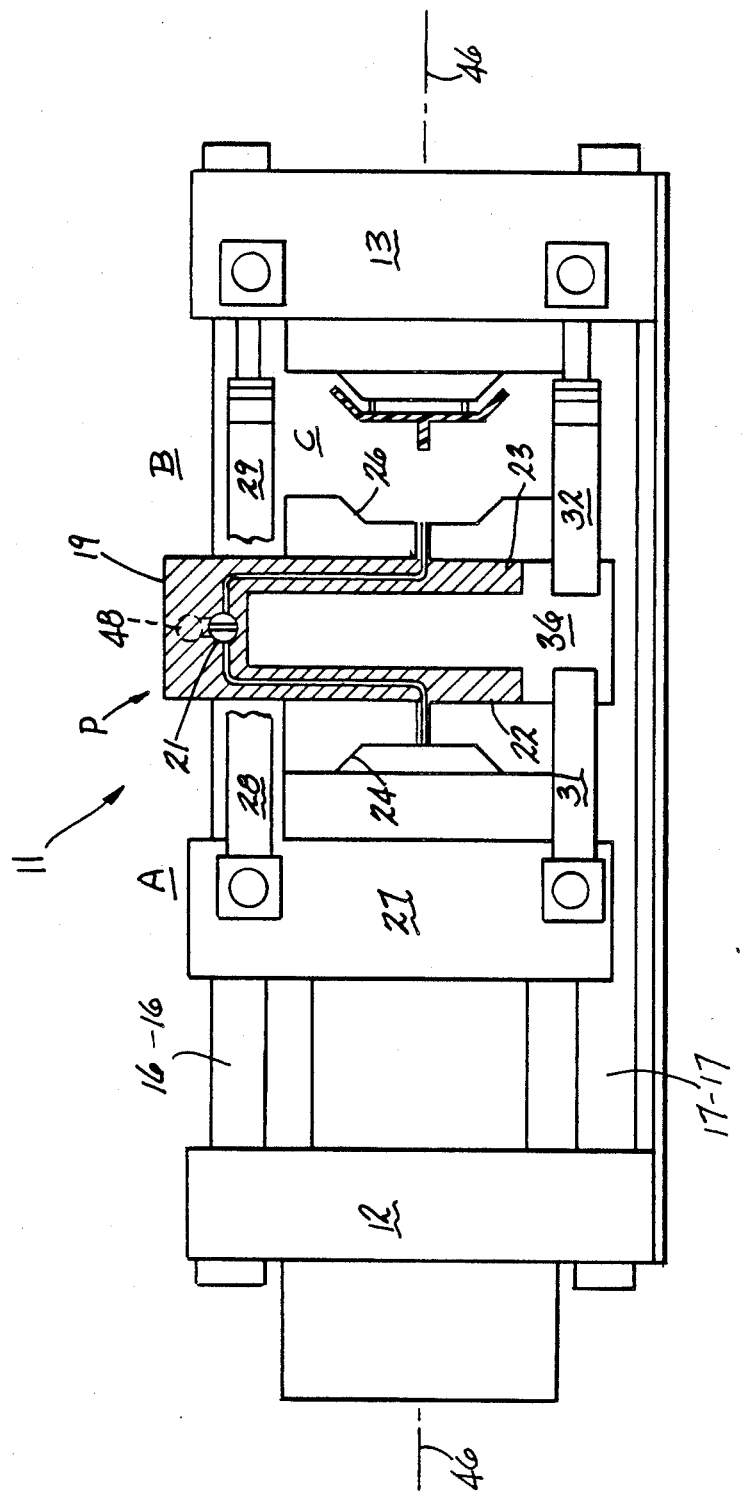
FIG. 1 is a plan view of a typical injection molding machine with portions broken away to illustrate the novel manifold structure of the present invention.

Referring now in detail to the drawings, FIG. 1 in particular, an injection molding machine indicated generally by the reference numeral 11 includes fixed platens 12 and 13, carried by a base frame supporting pairs of tie rods 16—16 and 17—17 in the usual and customary fashion A movable central platen, indicated generally at P, incorporating a hot runner system comprises a manifold distributor block 19, moldable material switching valve means 21, manifold means defining manifold sections 22 and 23, and mold halves 24 and 26 supported by said central platen P.

As described in detail in parent application Ser. No. 150,157, central platen P is movable in cooperation with movable platen 27 to open and close mold halves at mold stations indicated at A and B to mold articles, such as at C.

As described further in said parent application Ser. No. 150,157, the clamps 28, 29, 31 and 32 operate to seal and maintain close contact between mold halves during molding in controlled sequence.

Referring to FIGS. 2, 3, 4 and 5. Note that manifold sections 22 and 23 straddle and are supported removably by movable central platen 36.

Except for suitable fastening means and spacers (not shown), the manifold sections 22 and 23 are isolated from the central platen 36 by an insulating air gap indicated by the reference numeral 105.

Frequently, it is desirable to include cooling coils in the central platen 36 to prevent overheating and attendant expansion of the platen leading to seizing to the tie rods 16—16 and 17—17.

Cooling of the central platen 36 in combination with the insulating air gap 105 protects the manifold sections 22 and 23 from overheating.

Mold halves 24 and 26 are also supported by the central platen 36 and the manifold sections 22 and 23 are sealed against respective mold halves 24 and 26 about the periphery of mold openings 106 by seal means defining a raised annulus or boss as indicated by the reference numerals 100 and 101.

Manifold distributor block 19, connected to the central platen 36, includes molding material switching valve 21 and provides support for an injection unit nozzle clamping means indicated generally by the reference numeral 42.

An injection unit in the form of an extruder 43, movably supported by means not shown, is movable from the position shown in FIG. 2 to an injection position indicated in FIG. 3, along a path or axis indicated by the reference numeral 44. The axis 44 is generally parallel to the injection mOlding machine axis (mold clamping axis) indicated by the reference numeral 46.

When the injection unit 43 is in the injection position (FIG. 3), nozzle 47 is aligned with and communicates with orifice 48 of manifold distributor block 19.

A seal, indicated at S (FIG. 5), is effected by the contact between surface 49 of manifold distributor block insert 51 and surface 52 of nozzle insert 53.

The seal is maintained by nozzle clamping means 42 defining, in this embodiment of the invention, cylinder 54 with cooperating piston 6 secured to the manifold distributor block 19 by rods 57. The nozzle clamping means acts along axis 60, which is perpendicular to machine or clamping axis 46.

Figure 5:
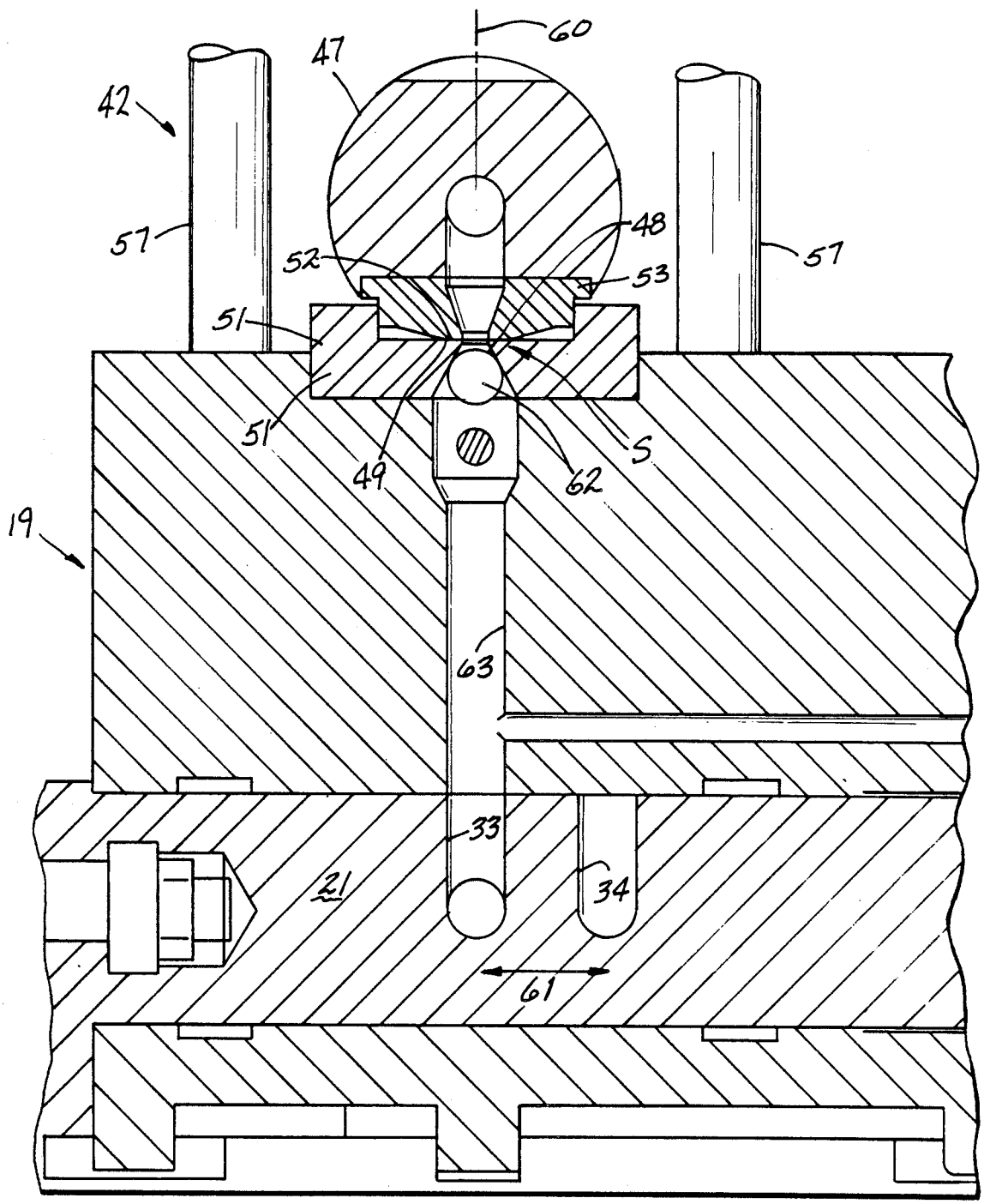

Switching valve means 21, upstream of the manifold means, defining a spool valve is operated in cyclic fashion in synchronism with the molding cycle to switch moldable material to appropriate manifold section 22 and 23 via conduits 33 and 34 (FIG. 5). The spool valve 21 is reciprocated by valve operating cylinder 59 (FIG. 4), as indicated by the arrow 61 of FIG. 5.

Ball check valve 62 is provided in moldable material flow path 63 to prevent leakage when the nozzle is unclamped and the seal between the nozzle and the manifold distributor block is broken.

A stuffer or packer unit 64 is located upstream of the spool valve 21 and communicates with the flow path 63 via conduit 66.

It is anticipated that the stroke of the injection unit 43 in moving from the position of FIG. 2 to the injection position of FIG. 3 will vary from one molding set-up to another depending upon the "build up" or thickness of the mold halves.

That is, the injection position will vary along the machine axis depending upon the dimensions of the mold halves in the closed position measured along the longitudinal or clamping axis of the machine.

The stroke of the injection unit is also advantageous in that it provides access for a robot or other automatic molded article retrieval device to enter open mold halves to grasp and remove a molded article C.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A method of operating an injection molding machine having an inlet orifice for receiving moldable material and a longitudinal mold clamping axis comprising the steps of:

providing an injection unit including a nozzle for supplying moldable material to said injection machine via said inlet orifice, moving the injection unit along an axis generally parallel to the longitudinal clamping axis to a position in which the nozzle communicates with the inlet orifice, and, thereafter, clamping and sealing the nozzle to the orifice along an axis which is generally perpendicular to said longitudinal clamping axis.

2. An injection molding machine comprising:

a movable platen means supported by tie rods and movable to and fro along said rods to define a first axis, an injection unit including a nozzle for supplying moldable material, said movable platen comprising a hot runner system having an orifice operable to connect with the nozzle of said injection unit, power means for clamping said nozzle to the orifice of said hot runner system along a second axis which is generally perpendicular to the first axis, said hot runner system including a manifold distributor means communicating with a manifold means, said manifold means being supported by and disposed on said movable platen, said injection unit including an extruder which advances moldable material along a path parallel to said first axis and said nozzle advances material along a path which is parallel to said second axis.

3. The molding machine of claim 2 in which said manifold means defines two separate, independent manifold sections straddling said movable platen.

4. The molding machine of claim 3 including valve means in said manifold distributor means upstream of said manifold means for directing moldable material to said manifold sections, selectively.

5. The molding machine of claim 4 in which a packer means is connected to said manifold distributor means and said valve means is operable, selectively, to connect the injection unit with said packer means, exclusively.

6. The molding machine of claim 3 in which the movable platen supports removable mold halves each communicating with an adjacent manifold section, said mold halves being interchangeable to accommodate the shape and size of articles to be molded whereby said movable platen remains a machine fixture.

7. The molding machine of claim 6 in which the injection unit is movable through a definite stroke along a path parallel to said first axis from a first position in which the unit is free of said hot runner system to a second position in which the unit is aligned with said hot runner system, said power means being operable along said second axis to clamp and seal the injection unit to said hot runner system, said first and second axes being generally perpendicular.

8. The molding machine of claim 7 in which the stroke of the injection unit is a function of a dimension of the mold halves measure along a line parallel to said first axis.

9. The mold machine of claim 7 in which the hot runner system includes a check valve to preclude leakage of molding material from said hot runner system when said injection unit is not in the sealing mode.

10. The molding machine of claim 6 in which each manifold section includes seal means abutting a mating mold half.

11. The molding machine of claim 10 in which the seal means defines a raised annulus or boss formed on one of the manifold sections and the mating mold half.

12. The molding machine of claim 3 in which each manifold section is isolated substantially from said movable platen by an insulating air gap.

13. An injection molding machine comprising: a movable platen means supported by tie rods and movable to and fro along said rods to define a first axis, an injection unit for supplying moldable material, said movable platen comprising a hot runner system operable to connect with said injection unit, power means for clamping said injection unit to said hot runner system along a second axis which subtends a substantial angle relative to said first axis, said hot runner system including a manifold distributor means communicating with a manifold means, said manifold means being supported by and disposed on said platen, and cooperating seal means on said hot runner system and on said injection unit to effect a seal between the hot runner system and the injection unit, said power means effecting a clamping action along said second axis, said second axis being generally perpendicular to said first axis, a main body of said injection unit being disposed generally parallel to the first axis.

* * * * *